Nov. 28, 1950 W. E. TAIT ET AL 2,531,651
FILM CASSETTE FOR CAMERAS
Filed May 7, 1947 4 Sheets-Sheet 1

INVENTOR.
Wilfred E. Tait and
August W. Stelpflug
BY
H. Lee Helms
ATTORNEY

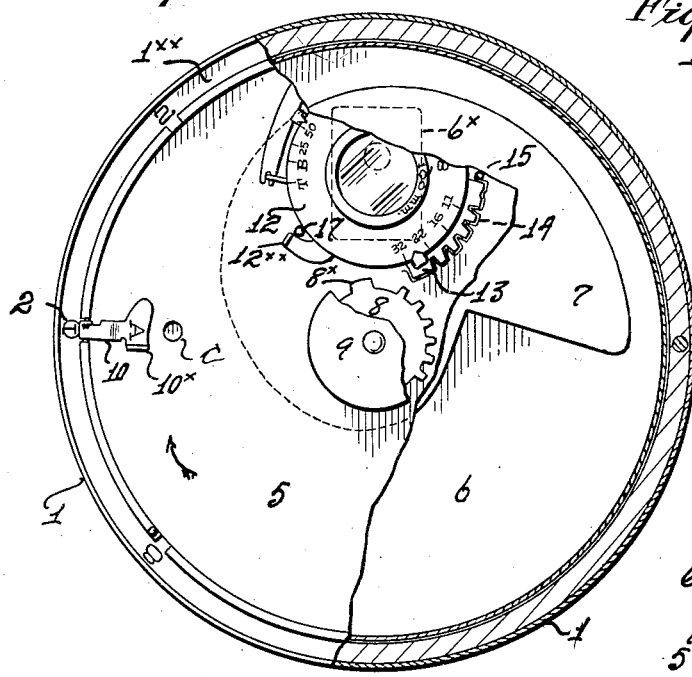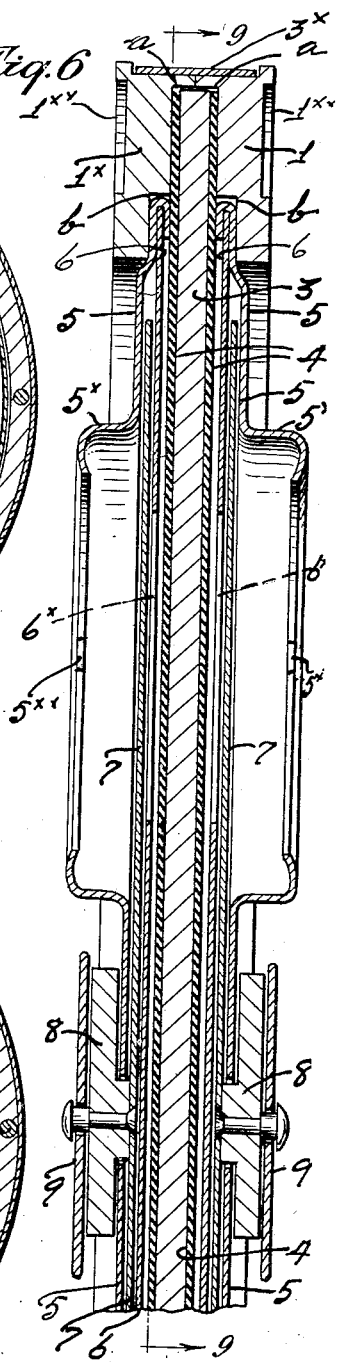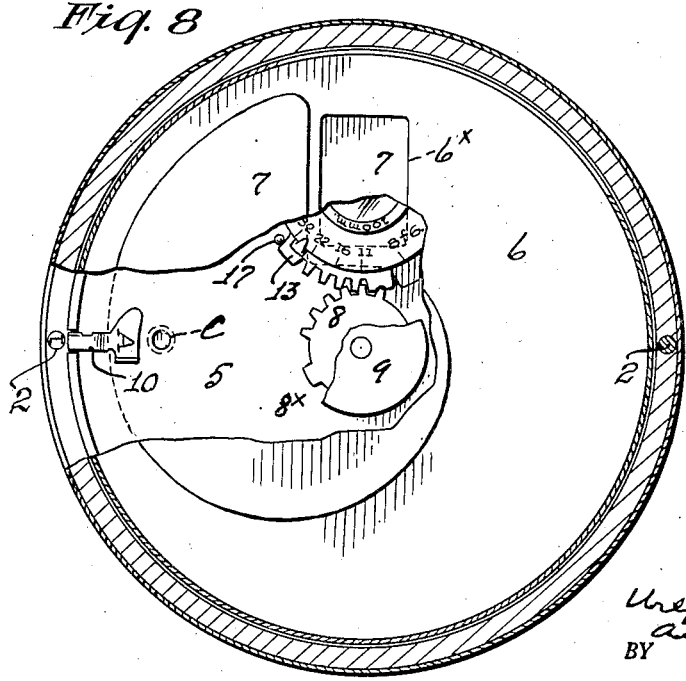

Nov. 28, 1950     W. E. TAIT ET AL     2,531,651
FILM CASSETTE FOR CAMERAS
Filed May 7, 1947     4 Sheets-Sheet 3
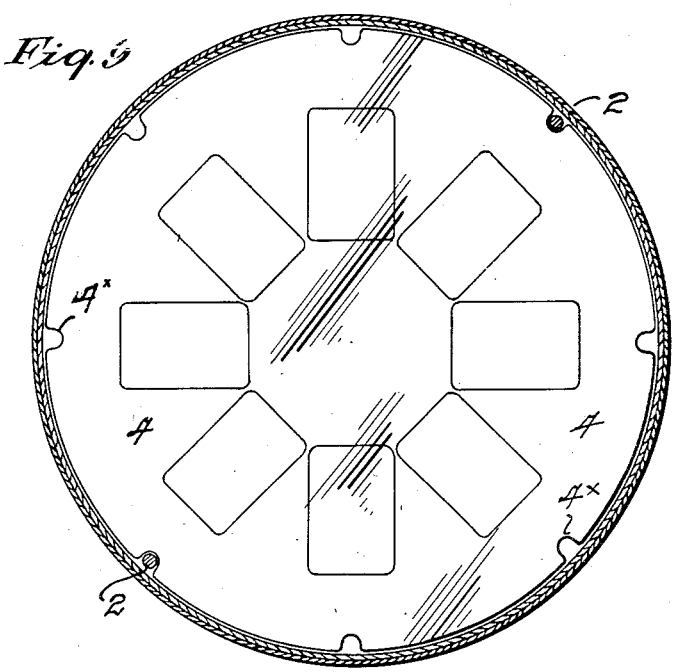
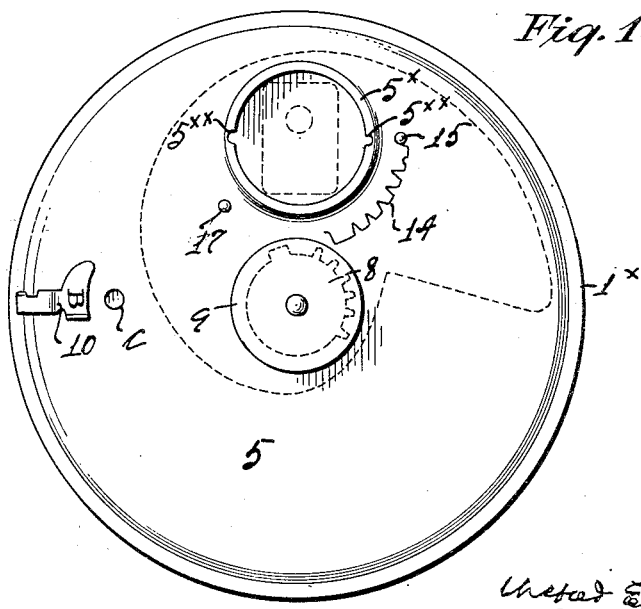

Nov. 28, 1950 — W. E. TAIT ET AL — 2,531,651
FILM CASSETTE FOR CAMERAS
Filed May 7, 1947 — 4 Sheets-Sheet 4
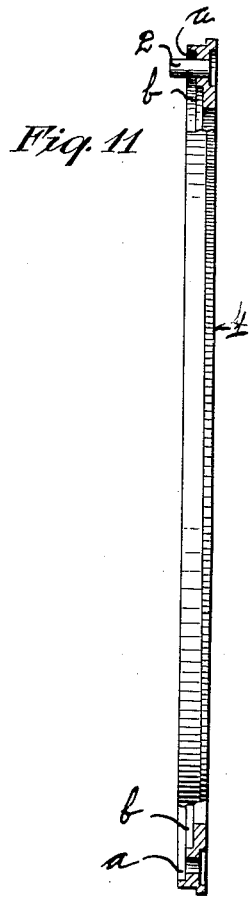
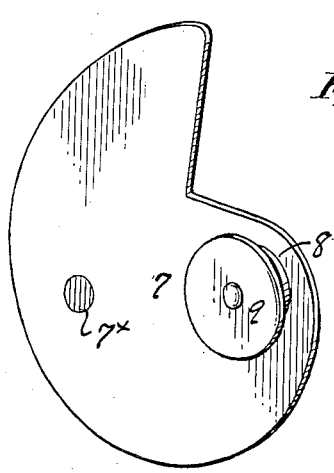
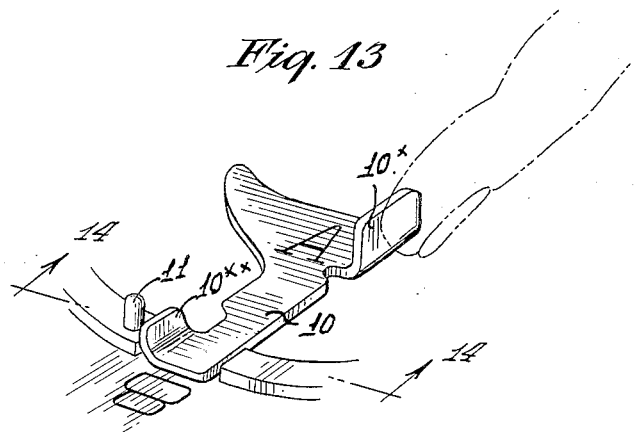
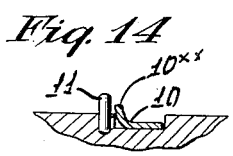
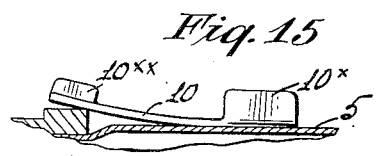
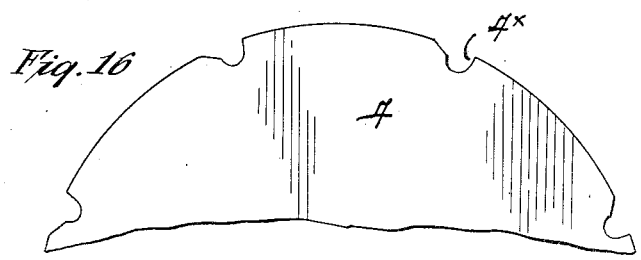

Patented Nov. 28, 1950

2,531,651

UNITED STATES PATENT OFFICE 2,531,651

FILM CASSETTE FOR CAMERAS

Wilfred E. Tait, Westport, and August W. Stellpflug, Weston, Conn., assignors to American Safety Razor Corporation, Brooklyn, N. Y.

Application May 7, 1947, Serial No. 746,496

10 Claims. (Cl. 95—38)

The object of the present invention is to provide a simple and effective camera employing a flat, light weight, holder for one or a plurality of sensitized films, the holder at one or both sides being adapted to receive a lens assembly and a shutter which is moved to open position by the installation of the lens, that element of the camera which receives the lens being rotatable, step by step, so that a plurality of images in ring formation may be produced upon the sensitized film.

The camera is of that type adapted for placement of the sensitized film, or two sensitized films, in a dark room and the transport of the thus loaded camera to the user with the shutter or shutters closed and to be opened by the placement of the lens assembly and the movement thereof to operative position. When the successive frames of the sensitized film are exposed, removal of the lens assembly will automatically close the shutter associated therewith, so that the camera may be mailed or otherwise transported to a central developing and reloading laboratory. Thus, prints from the exposed negative may be mailed back to the user along with the freshly loaded camera. The latter being flat and largely constructed of aluminum or other light metal may be enclosed in an envelope for mailing.

The casing of the camera consists of two casing members, preferably round, which are connected by registration studs and a removable adhesive tape, which may be of metallic foil, applied to the periphery of the assembled casing. Thus the camera may be disassembled without the necessity of turning screws, or removing eyelets or rivets, and simply by removing the adhesive tape and separation of the casing sections.

The shutter moves circularly through a gear connection with the lens assembly, this connection being of special form to insure harmonious action of the interlocking teeth, and when the lens is turned to operative position, a visual indicator on the shutter, exposed by a sight opening, shows that the shutter is open and that the camera is in condition to take pictures. The lens assembly cannot be removed until it is reversely rotated so as to bring the casing shutter into closed position.

The above and other objects of the invention will be described with reference to the accompanying drawings, in which Figure 1 is a plan view showing one face of the camera with a lens assembly carried thereby and in position after opening the shutter, the registration latch shown in the drawing being in position for exposure of the first frame of the sensitized film;

Figure 6 is an enlarged transverse section, on the line 6—6, Figure 3;

Figure 7 is a view similar to Figure 1, partly broken away, showing the lens assembly in initial position, prior to its movement to operative position for opening the shutter;

Figure 8 is a view similar to Figure 7 with the lens assembly moved to shutter opening position;

Figure 9 is a sectional view on the line 9—9, Figure 6;

Figure 10 is a somewhat schematic plan view showing in dotted lines the position of the shutter when all of the sensitized film frames have been exposed and the camera is ready for transport to a central laboratory for development of the film or films;

Figure 11 is a transverse section through one of the casing members;

Figure 12 is a perspective view of the shutter;

Figure 13 is an enlarged schematic view showing the position of the registration latch after the last frame of the sensitized film has been exposed, the movable elements being locked against further movement, with the exception of the lens assembly which may then be removed after it is rotated to close the casing shutter;

Figure 14 is a fragmentary section on the line 14—14, Figure 13;

Figure 15 is a schematic view showing how the registration latch rides over the edge of a detent slot in the movement of the lens mounting to a new frame;

Figure 16 is a fragmentary plan view of a sensitized film sheet adapted for use in the camera.

Figure 2:
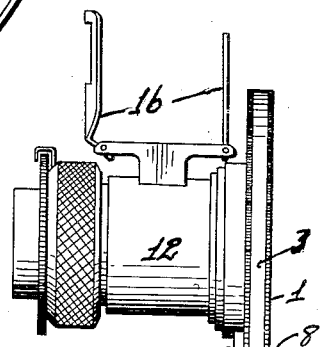
Figure 2 is a view showing the camera in edge elevation with the lens assembly carried thereby.
Figure 3:
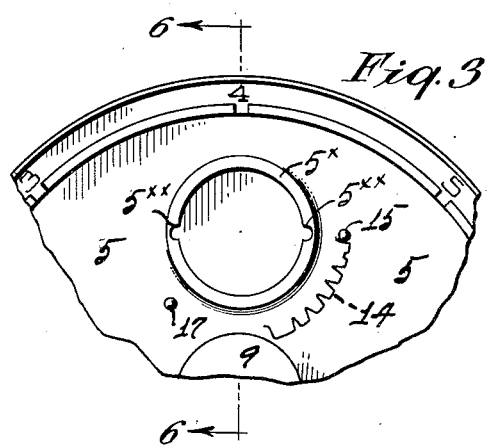
Figure 3 is a fragmentary plan view showing the lens receiving area of one face of the camera, with the lens assembly removed, the shutter being in closed position.
Figure 4:
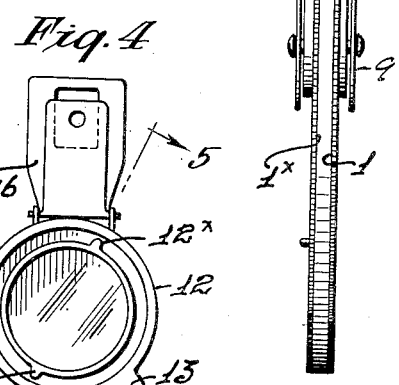
Figure 4 is a view in elevation taken at the rear of the lens assembly.
Figure 5:
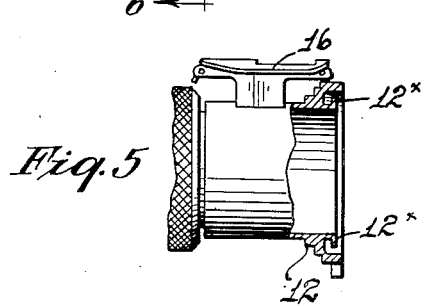
Figure 5 is a fragmentary side elevation of the lens assembly, partly broken away.

Referring to the drawings and particularly Figures 6 and 7, it will be seen that the camera casing consists of two sections which are of ring formation, two recesses being formed in the inner ring wall of each section. The casing sections are shown at 1 and 1$^x$ respectively and the recess of greater diameter is indicated at $a$ whereas the recess of lesser diameter is indicated at $b$. The two sections come into abutment peripherally, and when thus abutted they may be held together by two instrumentalities. The first means consists of two studs 2 which may be carried by either one of the casing sections and which frictionally fit within apertures formed in the other casing section so as to accurately register the sections. The second means consists of an adhesive tape $3^x$ received within a peripheral channel of the assembled casing sections as shown more particularly in Figures 6 and 2. This tape preferably is of stout metallic foil carrying on one face a pressure adhering adhesive of such nature that the tape may readily be stripped off when the casing sections are to be disassembled for removal of exposed film and reloaded.

When the casing sections are assembled, their recesses $a$ provide a chamber at the periphery of the casing for reception of a division plate 3 which may support at each face thereof a sensitized film 4.

Within each recess $b$ is an assembly consisting of a lens carrier disk 5, having its margin bent over and clamped to an image aperture plate 6. Between the lens carrier disk and the image aperture plate, is rotatably mounted a shutter 7. This shutter is welded, riveted, or otherwise secured to the hub of a ratchet wheel 8, the teeth of the wheel being shielded by an outer disk 9 serving as a cover. In the present embodiment, the shutter, in each case, will lie closely adjacent to image aperture plate 6 so as to normally close the image aperture $6^x$ thereof.

Figure 1:
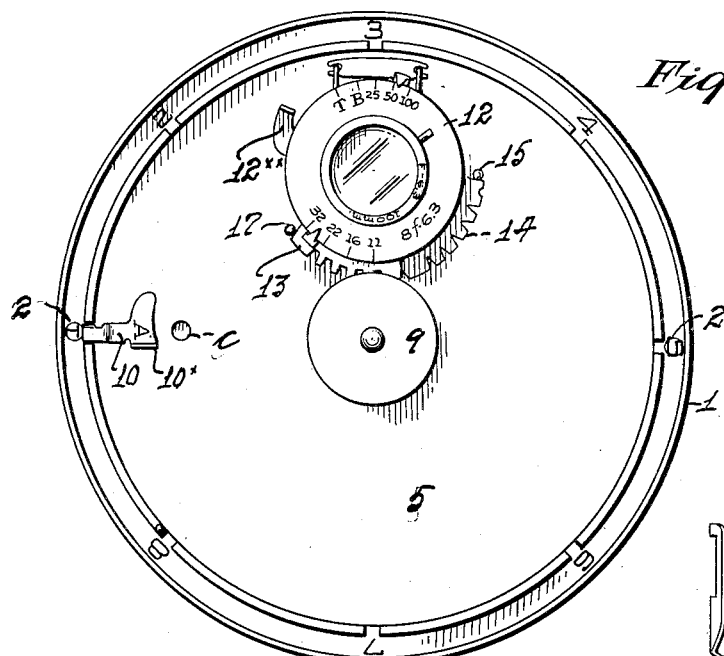

Each ring section of the casing may be formed with a channel $1^{xx}$ so as to provide an outwardly projecting annular rib, slotted at spaced points, so that a spring latching finger 10, welded or otherwise secured to lens carrier 5, may be brought into successive registration with the spaced slots, the position of which is indicated by the numerals opposite the slots in the drawings. In Figures 1 and 10, the views show opposite faces of the camera so that the spring latch finger 10 at one face may be designated A and at the other face B. The spring latch finger preferably has the formation shown in Figures 13 to 15, a finger piece thereof being shown at $10^x$. The latch will act as a temporary detent and registration device for movement of the lens carrying disk 5, its associated aperture plate 6 and the shutter 7 to expose successive frames of the sensitized film. The spring latch finger in the embodiment shown will thus be successively moved with the lens assembly from position 1 of Figure 1 to the final position 8. At this point, the spring finger will snap into the slot at 8. As shown in Figure 13, it cannot move in its preceding direction of movement because of a stop pin 11, and it cannot move in reverse direction because its straight edge rearwardly of the upturned portion $10^{xx}$ abuts the straight edge of the slot wall.

The lens carrier disk 5 is formed with a flanged neck $5^x$, the flange of which is provided with oppositely disposed clearance apertures $5^{xx}$ for reception of the lugs $12^x$ of lens mounting member 12 which member also is provided with rack teeth including an initial tooth 13 of greater width.

To enable exact registration quickly and easily between the rack teeth of the lens mounting 12 relatively to the flanged neck of the lens carrying disk 5 for immediate insertion of the lugs $12^x$ into the apertures $5^{xx}$, disk 5 may have printed or etched thereon at 14 a boundary line replica of the rack teeth, and disk 5 may also carry a stop pin 15. Thus when the lens assembly is in position with the lens mounting 12, as shown in Figure 7, and is pressed inwardly to cause the lugs $12^x$ to lie just back of the flange of neck $5^x$, the lens assembly may then be rotated from position 7 to position 8 whereby the larger tooth 13 of the lens mounting rack teeth will engage the side of a large tooth $8^x$ of the shutter-carrying ratchet wheel 8, followed by exact intermeshing of the two sets of teeth and rotation of the shutter 7 to open position as shown in Figure 8. At this point, indicia such as a red marking $7^x$ on the shutter would be exposed through an aperture at $c$ in plate 5, as a warning signal that the casing shutter is open.

Any suitable form of lens assembly may be provided with its mounting provided with suitable rack teeth as shown in the drawings. Such assembly will be provided with its own shutter, as customary, and the shutter operated, as in usual case, by a finger lever $12^{xx}$. Of course, a bulb shutter operating device may be employed if desired. In the particular type of lens assembly shown in the drawings, a foldable type of focusing sight 16 is shown.

Inasmuch as the shutter is thrown open by a relatively short rotational movement of the lens assembly, the shutter meant being that of the casing and shown at 7, I limit such rotational movement of the lens assembly by means of a stop pin 17 on the disk 5. Also, to provide means for holding the sensitized film from movement through frictional engagement by the turned over margins of disk 5, I notch the sensitized film sheets 4 so that the walls of any two opposed notches will engage the connector studs 2.

In the operation of the camera, and assuming that it is loaded with film as shown in Figure 6 and the shutters positioned to close the image openings of plates 6, the lens assembly may be positioned with respect to the flanged neck $5^x$ at either face of the camera, thence moved inwardly to the position shown in Figure 7 and thence rotated to the left until the parts assume the position of Figure 8. In this position, the shutter 7 will be open, but image opening $6^x$ will be subject to the opening of the shutter customarily forming a part of the lens assembly. The camera may then be put into focus and the initial frame of the appropriate sensitized sheet 4 exposed. The finger piece of spring latch 10 may then be employed to move the lens assembly, plates 5 and 6, and the interposed shutter 7, as a rotational group until the spring latch finger snaps into slot 2. Moderate pressure will enable the turned up tip of the latch finger to ride out of the slot. After all of the frames have been exposed, the said rotational group will be automatically locked in position by the means shown in Figure 13, and the group cannot be moved to the left or to the right.

At this point, the lens assembly cannot be removed until its own rotation is reversed and it is brought back to the position of Figure 7, whereby the lugs $12^x$ of the lens mounting will again be brought into registration with the flange apertures $5^{xx}$ of the lens assembly carrier disk 5, and the lens assembly may then be withdrawn and used in the same manner at the opposite face of the camera for exposure of the second film 4.

In the said movement of the lens assembly 2 to withdrawal position, the teeth of the lens mounting will rotate the shutter to closed position as shown in Figure 7.

It will be understood that various modifications may be made in the form and arrangement of the elements constituting the embodiment illustrated in the drawings, without departure from the spirit of the invention, what we claim and desire to secure by Letters Patent being as follows:

1. In a camera, a casing comprising separable sections and adapted to enclose a sensitized film, a rotational group of elements carried by the casing and including an outer plate apertured to receive a lens mounting, a lens mounting adapted to be received by and then rotationally interlocked with the aperture of the outer plate and having a toothed extension, a shutter rearwardly of the outer plate, and a toothed member carried by the shutter and adapted for operative engagement by said toothed extension when the lens mounting is received in the aperture of the outer plate.

2. A camera constructed in accordance with claim 1 in which the outer plate is marked with the outline of the toothed extension of the lens mounting at the position thereof for reception by the aperture of the outer plate, said outer plate also being provided with stops to limit the rotational movement of the lens mounting when the lens mounting is received in the aperture of the outer plate.

3. In combination, a light-tight film cassette of the disc type comprising a film-supporting base and a cover therefor, said cover having an aperture and being provided with a normally closed aperture shutter, said shutter comprising a slide movable edgewise across said aperture, an image-forming unit, means for removably attaching said unit to said cover in alignment with said aperture, and means automatically operable to move said slide to uncover said aperture as said unit is attached and to move said slide to cover said aperture as said unit is detached, said last-named means comprising one set of teeth carried by said slide and a meshing set of teeth carried by said unit.

4. In combination, a light-tight film cassette of the disc type comprising a film-supporting base and a cover therefor, said cover having an aperture and being provided with a normally closed aperture shutter, said shutter comprising a slide pivoted to said cover for rotative edgewise movement across said aperture, an image-forming unit, means for removably attaching said unit to said cover in alignment with said aperture, and means automatically operable to rotate said slide to uncover said aperture as said unit is attached and to rotate said slide to cover said aperture as said unit is detached, said last-named means comprising a toothed gear segment carried by said slide and a cooperating set of teeth carried by said unit, said teeth being so relatively positioned that they disengage completely when said unit is completely detached.

5. In combination, a light-tight film cassette of the disc type comprising a film-supporting base and a cover therefor, said cover having an aperture and being provided with a normally closed aperture shutter, said shutter comprising a slide pivoted to said cover for rotative edgewise movement across said aperture, an image-forming unit, means for removably attaching said unit to said cover in alignment with said aperture, said means being of a character which involves a rotative movement of the unit in one direction to effect attachment thereof and a rotative movement of the unit in reverse direction to effect detachment thereof, and means automatically operable by said unit during its rotative movements for opening said shutter as the unit is attached and closing said shutter as the unit is detached, said last-named means comprising cooperating toothed gear segments carried by said slide and unit respectively, said gear segments being so relatively positioned that they disengage completely when said unit is completely detached.

6. In a camera, a casing comprising separable sections each section being formed of a ring-like member having a recess of major diameter and a recess of minor diameter both at the inner face of the section, the major recesses and the minor recesses of the said sections being so located that when the two sections are assembled, the recesses will be in registration to each other to form respectively a central chamber of the two minor recesses and a circumferential extension of said central chamber of the two major recesses, a separation plate having its periphery engaged in the extension of said central chamber and its central portion dividing the central chamber into chambers on opposite sides thereof and a rotational group of elements within said divided chambers including an outer plate apertured to receive a lens mounting, an inner plate formed with an image aperture, and a shutter intermediate the inner and outer plates, in combination with a lens mounting having a toothed extension with an initial tooth of major width, and a toothed member carried by the shutter exteriorly of the outer plate and having an abutment and reception area for the tooth of major width carried by the lens mounting extension followed by teeth of lesser width.

7. A light-tight film holding cassette for receiving a lens mount in an aperture thereof for engaging a toothed extension of the lens mount with a mating toothed extension on a shutter carried by the cassette to move said shutter from its aperture closing position when the lens mount is received in the aperture and attached to the cassette and to move the shutter from its open position when the lens mount is detached; said light-tight film cassette comprising a base for supporting sensitized film and a cover to exclude light from reaching the film, said cover having an aperture through which the film can be exposed and for receiving and attaching the lens mount thereto, said cassette having a shutter which is movable edgewise across the aperture to prevent film exposure therethrough when the lens mount is detached, said shutter having a toothed extension adapted to mesh with the toothed extension on the lens mount when the lens mount is entered into said aperture in the cassette cover for attachment thereto, whereby the entry of the lens mount into the aperture and its attachment to the cassette will engage the toothed extension on the lens mount with the toothed extension of the shutter and move the shutter to its aperture opening position and detachment of the lens mount will move the shutter to its aperture closing position.

8. An image-forming unit for entrance into an aperture of a light-tight film holding cassette for engaging a toothed extension of the image-forming unit with a mating toothed extension on a shutter carried by the cassette to move said shutter from its aperture closing position when the unit is received in the aperture and attached to the cassette and to move the shutter from its open position when the image-forming unit is detached; said image-forming unit comprising a lens mounting tube, one end of which is adapted to be received by and then rotationally interlock with the said aperture of the cassette, said tube having a toothed extension adapted to mesh with the toothed extension on said cassette shutter when the lens mounting tube is entered into said aperture in the cassette for attachment thereto, whereby the entry of the lens mounting tube into the aperture and its attachment to the cassette will engage the toothed extension on the lens mount with the toothed extension of the shutter and move the shutter to its aperture opening position, and detachment of the lens mount will move the shutter to its aperture closing position.

9. A light-tight film holding cassette for receiving a lens mount in an aperture thereof for coupling engagement of an extension of the lens mount with a mating extension on a shutter carried by the cassette to move said shutter from its aperture closing position when the lens mount is received in the aperture and attached to the cassette and to move the shutter from its open position when the lens mount is detached; said light-tight film cassette comprising a base for supporting sensitized film and a cover to exclude light from reaching the film, the cover being rotatable with respect to the base about its own center and having an aperture spaced to one side of its axis of rotation through which the film can be exposed and for receiving and attaching the lens mount thereto, said cassette having a shutter which is movable edgewise across the aperture to prevent film exposure therethrough when the lens mount is detached, said shutter having an extension including a portion mating with a portion of the extension on the lens mount to couple the two together in driving relation in both directions when the lens mount is entered into said aperture in the cassette cover for attachment thereto, whereby the entry of the lens mount into the aperture and its attachment to the cassette will engage the mating portions of the extension on the lens mount and the extension of the shutter coupling them together and move the shutter to its aperture opening position, and detachment of the lens mount will move the shutter to its aperture closing position.

10. In combination, a light-tight film holding cassette comprising a base for supporting sensitized film and a cover to exclude light from the film, said cover having an aperture through which the film can be exposed and a shutter which is movable across the aperture to aperture closing and opening positions, a detachable image-forming unit adapted to be received in said aperture for attachment to the cover, said shutter and said image-forming unit each being provided with an extension, said extensions having mating portions which engage and couple together the unit and the shutter for movement of the latter to aperture opening position when the image-forming unit is inserted into the aperture and attached to the cassette cover, said extension mating portions remaining coupled together in driving relation to move the shutter to its aperture closing position while the image forming unit is being detached until detachment is completed.

WILFRED E. TAIT.
AUGUST W. STELLPFLUG.

REFERENCES CITED

The following references are of record in the file of this patent:

UNITED STATES PATENTS

| Number | Name | Date |
|---|---|---|
| 1,127,539 | Stern | Feb. 9, 1915 |
| 2,188,974 | Dilks | Feb. 6, 1940 |

FOREIGN PATENTS

| Number | Country | Date |
|---|---|---|
| 202,046 | Great Britain | Aug. 13, 1923 |